F. G. GALE.
MACHINE FOR FORMING TUBES.
APPLICATION FILED MAY 27, 1920.

1,435,835.

Patented Nov. 14, 1922.
6 SHEETS—SHEET 1.

Inventor.
Francis G. Gale
by Heard Smith & Tennant.
Attys.

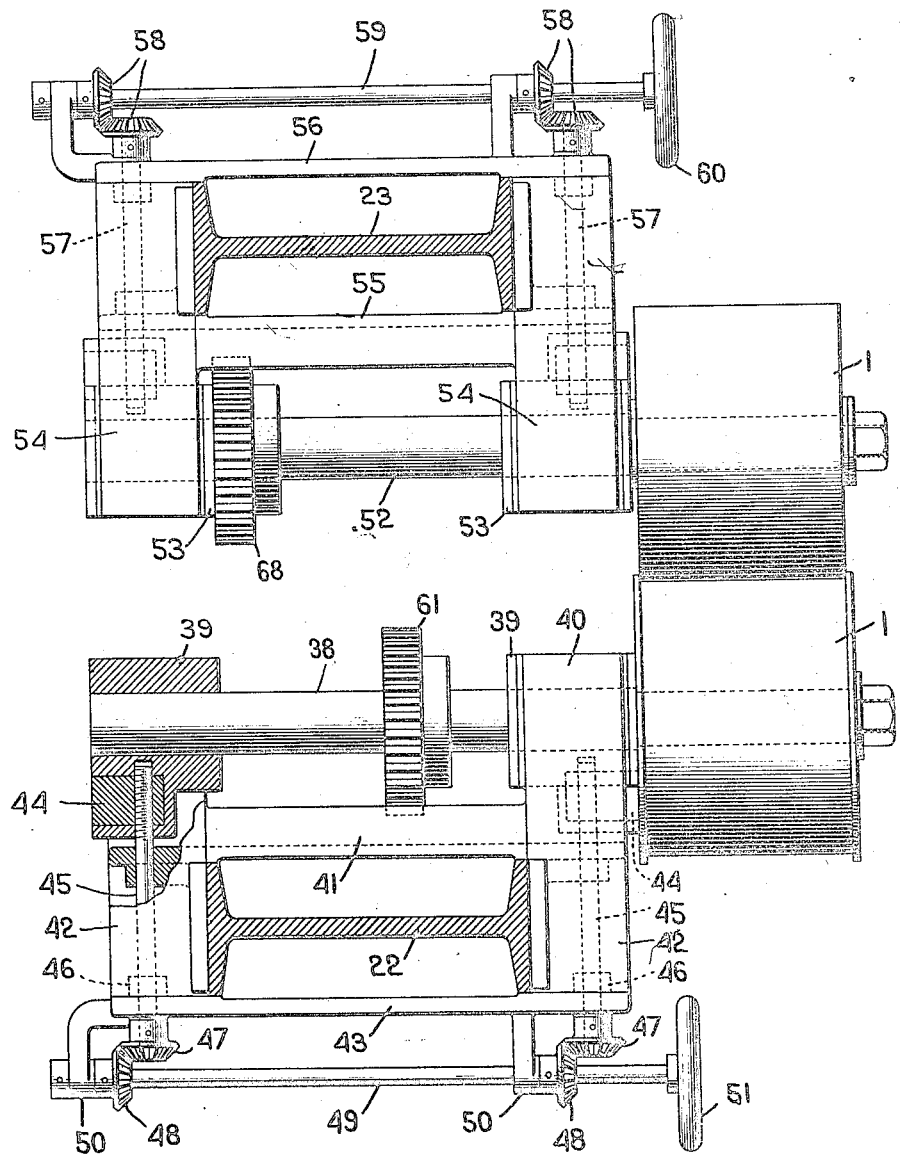

F. G. GALE.
MACHINE FOR FORMING TUBES.
APPLICATION FILED MAY 27, 1920.

1,435,835.

Patented Nov. 14, 1922.
6 SHEETS—SHEET 6.

Inventor.
Francis G. Gale
by Heard Smith & Tennant.
Attys.

Patented Nov. 14, 1922.

1,435,835

UNITED STATES PATENT OFFICE.

FRANCIS G. GALE, OF WATERVILLE, QUEBEC, CANADA.

MACHINE FOR FORMING TUBES.

Application filed May 27, 1920. Serial No. 384,742.

*To all whom it may concern:*

Be it known that I, FRANCIS G. GALE, a subject of the King of Great Britain, residing at Waterville, Province of Quebec, Dominion of Canada, have invented an Improvement in Machines for Forming Tubes, of which the following description, in connection with the accompanying drawing, is a specification, like characters on the drawing representing like parts.

This invention relates to machines for forming tubes from skelps and has for one of its objects to provide a novel manner of mounting the bending rolls and providing for the adjustment thereof.

In the drawings, Fig. 1 is a side view of a machine embodying my invention;

Fig. 5 is an enlarged sectional view on the line 5—5, Fig. 1;

Figure 1:
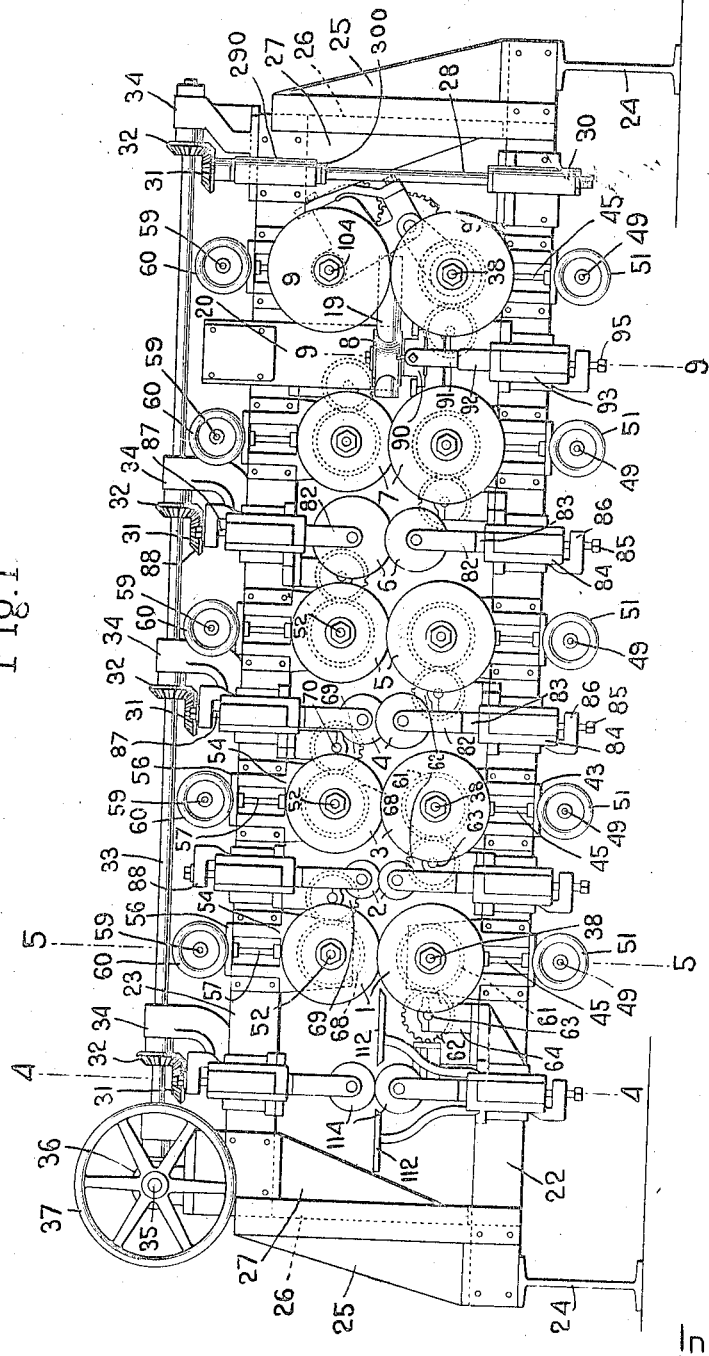

The tube-forming machine herein shown is provided with a plurality of pairs of forming rolls which are arranged to act successively on the skelp as it is fed to the machine and thereby to gradually shape the skelp into tubular formation. Nine such pairs of rolls are herein illustrated and they are indicated at 1 to 9 inclusive in Fig. 1 but the number of pairs is not important.

In the construction herein shown the first seven pairs of rolls are arranged to rotate about a horizontal axis, the eighth pair, or next to the last pair, rotate about vertical axes and the last pair 9 rotates about horizontal axes.

A mandrel 19 is situated between the rolls of the last two pairs, said mandrel serving to give interior support to the tube during the final forming stage. This mandrel 19 is supported at one end by a thin fin 20 and it is situated so that the tube passes over it just after it leaves the rolls 7 and before it is acted on by the rolls 8, which as stated above, are arranged to rotate about vertical axes. The rolls 8 operate to close the tube so as to bring the edges thereof against the fin 20, which is very thin, and from the rolls 8 the tube passes to the final rolls 9. The final rolls 9 act on the tube and force the edges thereof close together thus completing the operation.

The rolls are preferably so mounted and sustained that the upper rolls of all pairs can be simultaneously adjusted toward and from the lower rolls, and the rolls of each pair can also be individually adjusted. With this double adjustment a machine is provided which is very flexible and can be easily set for operating on different sizes and shapes of tubes and skelps of different thicknesses.

The frame herein illustrated for supporting the rolls comprises a lower supporting member herein shown in the form of a girder 22 on which the lower rolls of the pairs are mounted, and an upper supporting member also shown as a girder 23 on which the upper rolls are sustained. The girder 23 is mounted for vertical adjustment by which all the upper rolls are simultaneously adjusted toward and from the lower rolls. The lower supporting girder 22 is shown as sustained on its ends on suitable rests or foundations 24, and it has at each end a vertical standard 25 provided with ways 26 in which is received a leg 27 rigid with and depending from the upper girder 23. These legs 27 and ways 26 provide for guiding the upper girder in its vertical adjusting movement. For vertically adjusting the upper girder a plurality of adjusting screws 28 are employed on each side of the frame. Each adjusting screw is journaled at its upper end in a bearing 290 carried by the upper girder and is provided with collars 300 engaging the bearings and which prevent longitudinal movement of the screw in the bearing. The lower end of each adjusting screw 28 is screw-threaded into a sleeve 29 supported in a box or housing 30 secured to the lower girder. These screws 28, therefore, constitute the supporting means for the upper girder. If said screws are turned, they will be screwed up or down in the sleeves 29 and will thereby raise or lower the upper girder.

Means are provided whereby the adjusting screws 28 are operated simultaneously so that whenever any adjustment is made, it will be uniform throughout the length of the girder. For this purpose, each adjusting screw 28 has at its upper end a bevel gear 31 which meshes with a gear 32 fast on a longitudinally-extending shaft 33 which is journaled in suitable bearings 34. There are two of these longitudinal shafts 33, one geared to the adjusting screws on each side of the frame. These two shafts are connected at one end by a cross-shaft 35 which is geared to both of the shafts by bevel gears 36, and this cross-shaft 35 is provided at one end with a hand-wheel 37 by which it may be turned.

From the above description, it will be apparent that rotation of the hand-wheel 37 will operate to rotate each of the adjusting screws 28 the same amount and by this means, therefore, a uniform adjustment of the upper girder is effected.

The rolls of some of the pairs are positively driven and the rolls of the other pairs are in the form of idlers. It is within the invention to apply power to the rolls of any pair, but in the preferred form of the invention herein shown, the rolls 1, 3, 5, 7 and 9 are positively driven and the intermediate rolls 2, 4, 6 and 8 are in the nature of idlers. The rolls of each pair are journaled in a suitable bearing which is preferably adjustably secured to the girder so that an individual adjustment of each roll can be effected in addition to the simultaneous adjustment above referred to.

The lower positively-driven rolls 1, 3, 5 and 7 are each mounted on a separate shaft, said shafts being indicated at 38. Each shaft 38 is journaled in two bearings 39 which are mounted in boxes or housings 40 carried by the girder 22. These housings may be sustained by the girder in any suitable way. As shown in the drawings, the two housings for each shaft are formed as integral portions of a casting 41 which rests on the girder and is provided with side portions 42 that embrace the sides of the girder. These side portions are connected together beneath the girder by a crosspiece 43. The bearings 39 are mounted for vertical adjustment in the housings 40 and means are provided for simultaneously adjusting the two bearings 39 of each shaft 38. Each of the bearings 39 carries a hardened steel nut 44 through which is screw-threaded a vertical adjusting screw 45 that is journaled at its lower end in the cross-piece 43. Each screw 45 has a collar 46 thereon which prevents it from moving vertically, and it also has thereon a bevel gear 47 meshing with a bevel gear 48 on a cross-shaft 49 which is journaled in bearings 50 carried by the cross-piece 43. This shaft 49 is provided with a hand-wheel 51 by which it may be turned, and with this arrangement the rotation of the shaft 49 will rotate the screws 45 and thus raise or lower the bearings 39. Each of the lower rolls 1, 3, 5 and 7 is similarly mounted and thus each lower roll can be independently adjusted in a vertical direction.

Figure 2:
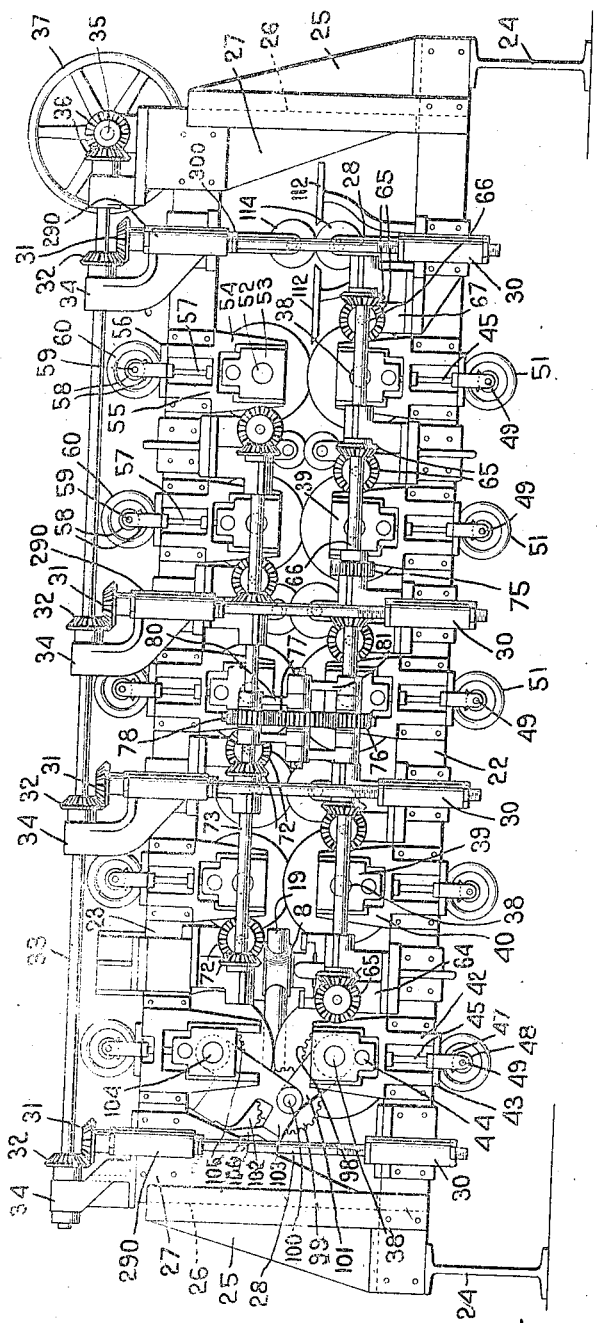
Fig. 2 is a side view showing the opposite side of the machine from that illustrated in Fig. 1.
Figure 3:
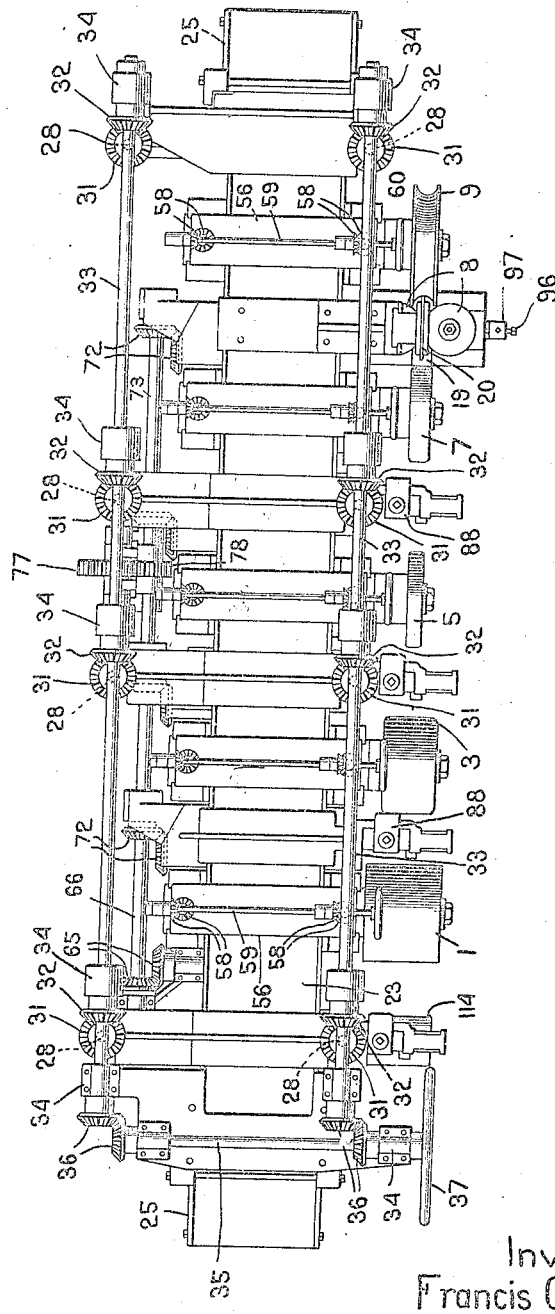
Fig. 3 is a top plan view.
Figure 4:
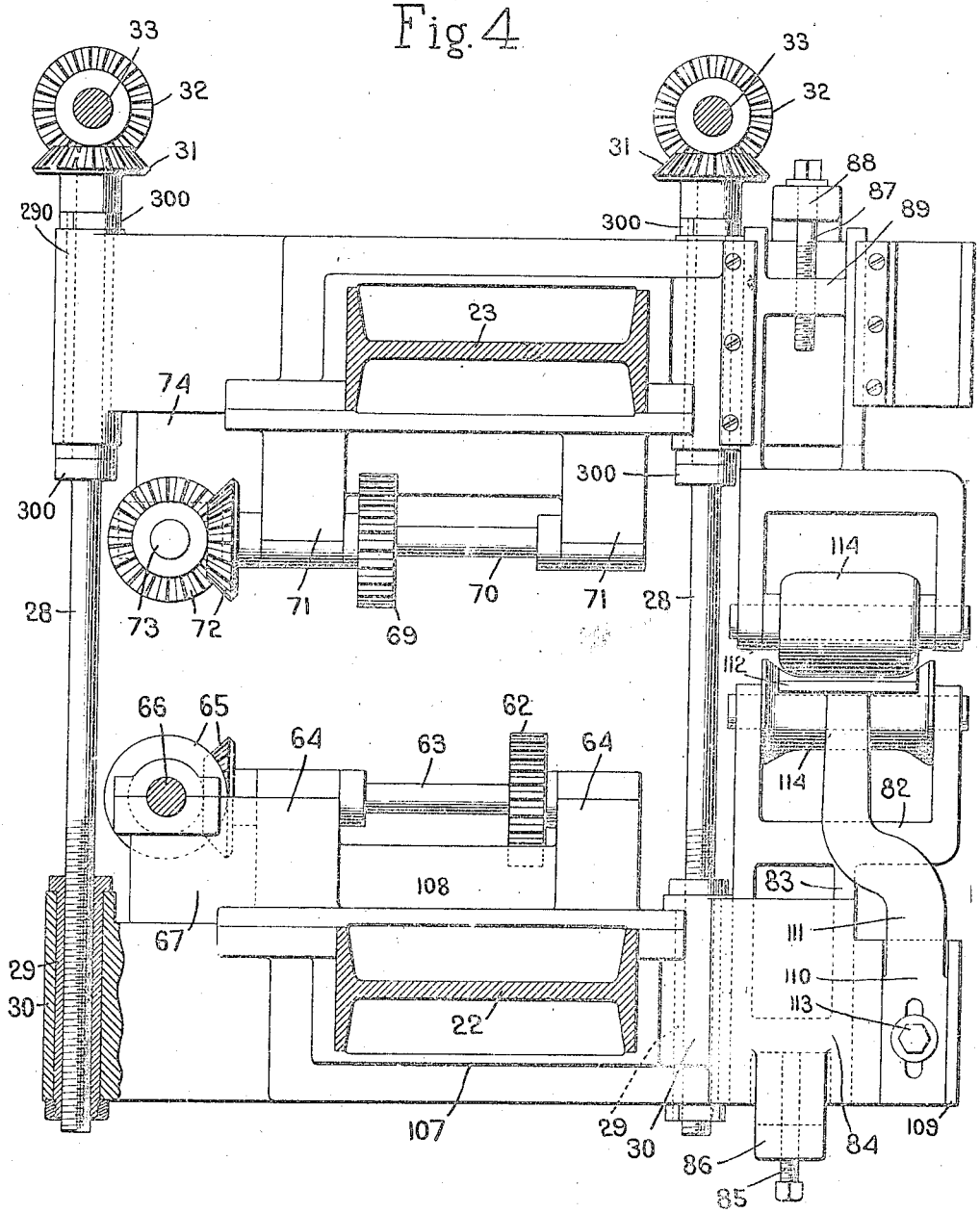
Fig. 4 is an enlarged vertical sectional view on the line 4—4, Fig. 1.
Figure 7:
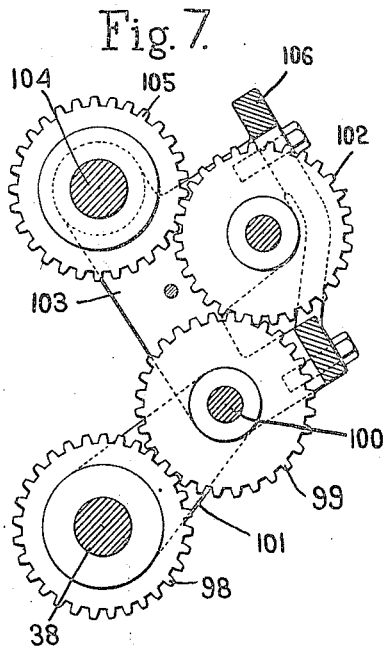
Fig. 7 is a side view of Fig. 6.
Figure 6:
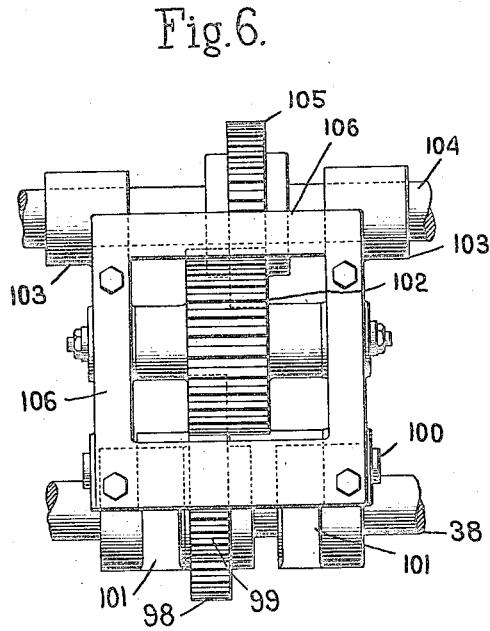
Fig. 6 is a detail view showing the driving means for the last pair of forming rolls.

The upper rolls 1, 3, 5 and 7 are mounted similarly to the lower rolls. Each upper roll is mounted on a shaft 52 which is sustained in bearings 53 that are vertically adjustable in suitable housings 54 similar to the housings 40. These housings are formed as integral parts of a casting 55, and the casting is secured to the upper girder 23 in a manner similar to that in which the casting 41 is secured to the lower girder, that is, by being attached to a cross-piece 56 which extends above the girder 23. This cross-piece 56 carries adjusting screws 57 which have screw-threaded engagement with the bearings 53, and the two adjusting screws 57 are connected by gearing 58 to a cross-shaft 59 which has a hand-wheel 60 thereon. Each of the rolls 1, 3, 5 and 7 is similarly mounted and thus means are provided for independently adjusting each upper roll. As stated above, these rolls 1, 3, 5 and 7 are positively driven. Each shaft 38 for the lower rolls has a gear 61 fast thereon which meshes with a gear 62 on a cross-shaft 63 that is journaled in suitable bearings 64 carried by the girder 22. Each cross-shaft 63 is connected by bevel gears 65 with a longitudinally-extending drive shaft 66 which is journaled in suitable bearings 67 carried by the frame. The shafts 52 for the upper rolls have gears 68 fast thereon which mesh with and are driven by gears 69 on cross-shafts 70 that are journaled in suitable bearings 71 carried by the upper girder 23. Each shaft 70 is connected by bevel gears 72 with a longitudinally-extending shaft 73 which is journaled in suitable bearings 74 carried by the frame. The two shafts 73 and 66 are geared together so as to rotate in unison, and power may be applied to either shaft. In Fig. 2 I have shown the drive shaft 66 as having a drive gear 75 fast thereon which may be driven from any suitable source of power.

Figure 8:
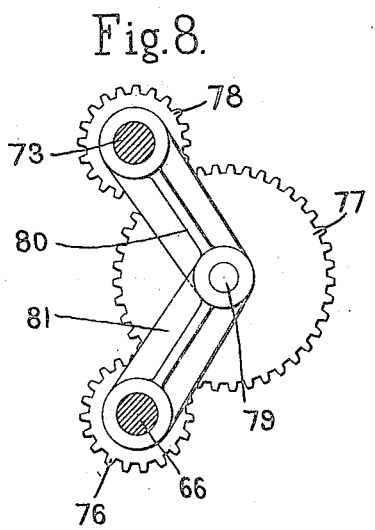
Fig. 8 is a view showing the driving connection between the two drive shafts.
Figure 9:
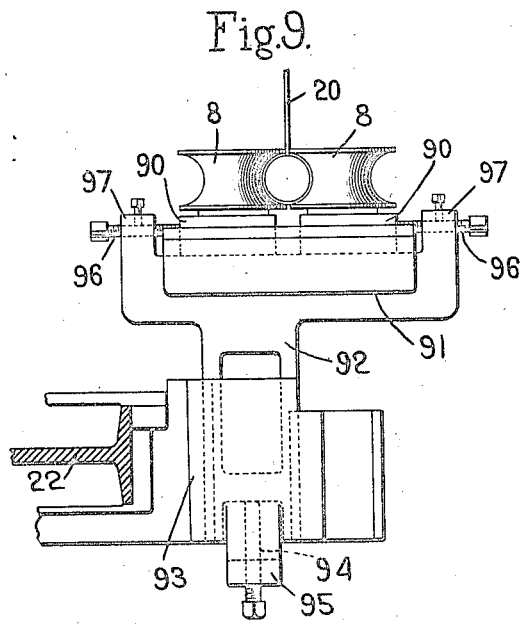
Fig. 9 is an enlarged sectional view on the line 9—9, Fig. 1.

It will be remembered that the upper drive shaft 73 is carried by the upper girder, and the lower drive shaft 66 is carried by the lower girder, and also that these girders are adapted to be adjusted toward and from each other. Consequently, the gearing which connects the shafts 73 and 66 is made so that it will permit of this adjustment without throwing the gearing out of operation. The gearing which it is proposed to use for this purpose is illustrated in Figs. 2 and 8, and comprises a gear 76 fast on the shaft 66 and meshing with an intermediate gear 77 which in turn meshes with a gear 78 fast on the shaft 73. The intermediate gear is journaled on a stud 79 which pivotally connects the ends of two radius arms 80 and 81 that are journaled on the shafts 66 and 73, respectively. With this arrangement, the shafts 73 and 66 can be moved toward and from each other without in any way disturbing the operative connection between said shafts.

The rolls 2, 4 and 6 are idler rolls. Each roll is mounted in a yoke 82 which is provided with a stem 83 that is slidable vertically in a guiding member 84 that is secured to the girder. Each of these yokes 82 is vertically adjustable independently. The adjustment of the yoke for each lower roll is effected by means of an adjusting screw 85 which is screw-threaded through an arm 86 rigidly secured to the girder 22, each screw 85 resting against the lower end of the stem 83 so that by turning the screw one way or the other the yoke 82 can be raised and lowered. For adjusting each yoke 82 for the upper roll an adjusting screw 87 is employed which is suspended in an arm 88 formed on the frame and has screw-threaded engagement with a portion 89 of the stem. In the case of the upper rolls the yokes are suspended on the adjusting screws 87, while in the case of the lower yokes, they are supported on said adjusting screws.

The idler rolls 8 which are arranged to rotate about vertical axes are pivotally mounted on blocks 90 which are slidably mounted in ways in a yoke-shaped support 91. This yoke-shaped support 91 is sustained on the frame in a manner similar to the lower yokes 82, that is, it has a stem 92 which is vertically adjustable in ways formed in a bracket 93, and it is retained in its vertically-adjusted position by an adjusting screw 94 which engages the lower end of the stem and is screw-threaded through a bracket arm 95. The blocks 90 are adjustable toward and from each other by means of adjusting screws 96 which have screw-threaded engagement with the ears 97 of the yoke and impinge against the outer faces of the blocks 90.

The last rolls 9 of the series are positively driven, and inasmuch as they operate on the outside of the tube, it is necessary that they should be capable of adjustment toward and from each other, so as to accommodate tubes of different diameter, and this requires a different adjustment from that provided for the other positively-driven rolls. Accordingly, a construction is provided by which the upper roll 9 is driven from the lower roll 9 by means of a flexible driving connection which permits these rolls to be adjusted toward and from each other without disturbing said connection. The shaft 38 on which the lower roll 9 is mounted has a gear 98 fast thereon which meshes with a gear 99 on a shaft 100 which is sustained in the end of radius arms 101 that are pivotally mounted on the shaft 38. The gear 99 in turn meshes with a gear 102 which is mounted on a shaft that is journaled in two bracket members or arms 103 that are pivotally mounted on the upper shaft 104 which carries the upper roll 9. This shaft 104 has a gear 105 thereon which meshes with the gear 102. 106 is a frame which is secured to the two arms or brackets 103 and which ties them together thereby making a rigid structure.

The lower roll 9 is positively driven from its cross-shaft 63 and the gearing above described provides for positively driving the upper roll 9 from the lower roll and at the same speed as said lower roll. The arms 103 and 101 form a link connection which allows the shafts 104 and 38 to be moved toward and from each other without disturbing the driving connection between the two.

It may be desirable to provide a suitable support for the skelp either as it is introduced into the machine or at some point during its passage through the machine, and I have accordingly provided a construction whereby such support may be placed at any desired point. The brackets or housings 84 in which the yokes 82 are supported are each formed as part of a yoke-shaped casting 107 which embraces the lower girder 22 and is connected to a cross member 108 that supports the bearing 64. These members 107, 108 form a supporting structure which entirely encircles the girder and furnishes the support for the bearings 64 and the yokes 82. Each of these castings 107 is provided with an extension 109 having guideways 110 adapted to support the stem 111 of a rest 112. These rests can be adjusted vertically and are retained in their adjusted position by clamping screws 113. Since each of the members 107 is provided with the guideway 110 it is possible to place a rest 112 at any point desired along the length of the frame. The extension 109 is preferably made with a guideway 110 on each side thereof so that it may support two rests, as shown at the left in Fig. 1.

The machine shown in Fig. 1 has two guiding rolls 114 situated in advance of the first pair of rolls 1 and which co-operate with the two rests 112 to guide the skelp as it is fed into the machine.

It will be noticed that the frame of the machine is relatively simple in design, it comprising the upper and lower girders 22, 23 on which are sustained a plurality of similar structures 107, 108 that carry the idler rolls and the cross-shafts for the positively-driven rolls and other duplicate supporting structures 43, 41, which sustain the bearings for the positively-driven rolls. Further, these supporting structures 107, 108, 41, 43 can be readily adjusted longitudinally of the girders and thereby spaced any desired distance apart, and since they are duplicate supporting structures the frame can be readily built to any desired length by simply employing girders of the desired length.

I claim:

1. In a tube-forming machine, the combination with a frame comprising two supporting members, of a plurality of pairs of forming rolls, one roll of each pair being supported by one supporting member and the other roll of each pair being supported by the other supporting member, and means for adjusting said supporting members toward and from each other.

2. In a tube-forming machine, the combination with a frame comprising upper and lower girders, of a plurality of pairs of forming rolls, each comprising an upper and lower roll, means for supporting the upper rolls on the upper girder, means for supporting the lower rolls on the lower girder, and means for adjusting the girders toward and from each other.

3. In a tube-forming machine, the combination with a frame comprising upper and lower girders, of a plurality of pairs of forming rolls, each comprising an upper and a lower roll, means for supporting the upper rolls on the upper girder, means for supporting the lower rolls on the lower girder, means for adjusting the girders toward and from each other, and means to adjust each roll independently on its girder.

4. In a tube-forming machine, the combination with a frame comprising upper and lower girders, of a plurality of tube-forming rolls, each comprising an upper roll and a lower roll, means for supporting the upper rolls on the upper girders, means for supporting the lower rolls on the lower girder, means for adjusting the girders toward and from each other, driving means for some at least of the upper rolls carried by the upper girder, and driving means for some at least of the lower rolls carried by the lower girder.

5. In a tube-forming machine, the combination with a frame comprising upper and lower girders, of a plurality of tube-forming rolls, each comprising an upper roll and a lower roll, means for supporting the upper rolls on the upper girders, means for supporting the lower rolls on the lower girder, means for adjusting the girders toward and from each other, driving means for some at least of the upper rolls carried by the upper girder, driving means for some at least of the lower rolls carried by the lower girder, and a driving connection between said two driving means which is operative in different adjusted positions of the girder.

6. In a tube-forming machine, the combination with a frame comprising upper and lower girders, of a plurality of pairs of tube-forming rolls, each pair comprising an upper roll and a lower roll, means for supporting the upper rolls on the upper girder and the lower rolls on the lower girder, a driving shaft journaled on the upper girder and operatively connected to some at least of said rolls, another driving shaft journaled on the lower girder and operatively connected to some at least of the lower rolls, means for adjusting the girders toward and from each other, and a driving connection between said shafts which is operative in different adjusted positions of the girder.

7. In a tube-forming machine, the combination with a frame comprising upper and lower girders, of a plurality of rolls sustained by the upper girder, a plurality of co-operating rolls sustained by the lower girder, said rolls operating to partially form a skelp into tubular shape, a pair of rolls sustained by the lower girder and adapted to act on the partially-formed tube and complete the tubular formation thereof.

8. In a tube-forming machine, the combination with a frame comprising upper and lower girders, of a plurality of rolls carried by the upper girder, a plurality of co-operating rolls carried by the lower girder, a plurality of adjusting screws journaled in bearings carried by the upper girder and having screw-threaded engagement with the lower girder, and means for actuating said screws simultaneously.

In testimony whereof, I have signed my name to this specification.

FRANCIS G. GALE.